United States Patent
Johnston et al.

(10) Patent No.: US 6,167,699 B1
(45) Date of Patent: Jan. 2, 2001

(54) SECONDARY AIR INJECTION SYSTEM FOR AN INTERNAL COMBUSTION ENGINE

(75) Inventors: Gary Edwin Johnston, Highland; William R. Aro; John E. Jubenville, both of Detroit, all of MI (US)

(73) Assignee: General Motors Corporation, Detroit, MI (US)

(*) Notice: Under 35 U.S.C. 154(b), the term of this patent shall be extended for 0 days.

(21) Appl. No.: 09/277,541

(22) Filed: Mar. 29, 1999

(51) Int. Cl.⁷ ..................................................... F01N 3/10
(52) U.S. Cl. ................... 60/304; 60/289; 60/307; 60/293; 181/277; 181/278; 181/279; 123/456
(58) Field of Search ............................... 60/304, 289, 307, 60/293; 181/277, 278, 279, 280; 123/573, 456; 73/35

(56) References Cited

U.S. PATENT DOCUMENTS

| | | | |
|---|---|---|---|
| 2,482,754 | * 9/1949 | Flint | 60/293 |
| 3,924,883 | * 12/1975 | Frank | 285/256 |
| 4,266,421 | * 5/1981 | McDougal | 73/35 |
| 4,373,354 | 2/1983 | Sawyer . | |
| 4,996,962 | * 3/1991 | Usui | 123/456 |

FOREIGN PATENT DOCUMENTS

10131819 * 10/1996 (JP) .

* cited by examiner

*Primary Examiner*—Thomas Denion
*Assistant Examiner*—Thai-Ba Trieu
(74) *Attorney, Agent, or Firm*—Anthony Luke Simon

(57) ABSTRACT

A secondary air injection system for reducing the hydrocarbon emissions of an internal combustion engine that is provided with an air pump supplying air to the exhaust manifold of the engine through a check valve assembly and an elastomeric hose characterized in that a baffle in the shape of a helix is located internally within the hose so as to cause the exhaust pressure waves from the engine and passing beyond the check valve assembly to impinge upon the solid compound surface of the baffle and be divided and diffused as they progress along spiraling paths so as to prevent objectionable noises being generated in the hose by the pressure waves.

6 Claims, 5 Drawing Sheets

SECONDARY AIR INJECTION SYSTEM FOR AN INTERNAL COMBUSTION ENGINE

TECHNICAL FIELD

This invention concerns air injection systems and more particularly is directed to a secondary air injection system for supplying air into the manifold of an internal combustion system that has a noise attenuating device for preventing objectionable noises from being created by pressure waves as they pass through the elastomeric hoses of the system.

BACKGROUND OF THE INVENTION

In order to meet the exhaust engine emission regulations promulgated by the state of California for trucks, certain truck manufacturers are using an secondary air injection system which supplies air to the exhaust manifold of the internal combustion engine to facilitate the combustion of hydrocarbons in the exhaust gases being treated by the catalytic converter. Typically, the secondary air injection system includes air conduits that take the form of metallic pipes positioned adjacent the exhaust manifold that lead to and are connected to rubber hoses that snake around the engine compartment for connection with the air pump. It has been found that secondary air injection systems of this type can experience objectionable noise at certain RPM and load conditions unless provided with a noise attenuating device in the rubber hoses. The root cause of the noise is an exhaust pressure wave that migrates past the check valve into the rubber hose plumbing. One truck manufacturer utilizes an in-line external resonator close to the system's check valves in each leg of the rubber hoses to eliminate the objectionable noise. Although the external resonators will eliminate the objectionable noise, it has been found that the use of such resonators for this purpose requires additional underhood packaging real estate and results in an increased system cost and complexity.

SUMMARY OF THE INVENTION

The present invention solves the problem of packaging, cost and complexity by providing a baffle in the form of a twisted stainless steel rectangular member that is inserted into each leg of the hose plumbing and positioned adjacent each check valve of the secondary air injection system. The twisted sheet metal baffle serves to diffuse the exhaust pressure wave emitted by the check valve and thus eliminates the objectionable noise.

Accordingly, an object of the present invention is to provide a new and improved air injection system for supplying air to the exhaust manifold of an internal combustion engine so as to facilitate combustion of hydrocarbons in the exhaust gases being treated by the catalytic converter and that includes an internal baffle in one or more legs of the hose plumbing for attenuating noise created by engine exhaust pressure waves.

Another object of the present invention is to provide a new and improved noise attenuating device that can be readily inserted into the hoses of a low emission secondary air injection system for an internal combustion engine and serves to eliminate objectionable noises caused by exhaust pressure waves moving through the hoses of the system.

A further object of the present invention is to provide a new and improved secondary air injection system for reducing the hydrocarbon emissions of an internal combustion engine that is provided with an air pump supplying air to the exhaust manifold of the engine through an elastomeric hose having a helix type baffle located internally within the hose so as to cause the exhaust pressure waves to impinge upon the solid compound surface of the baffle and be split in two as they progress along two spiraling paths to prevent objectionable noises being generated by the pressure waves.

A still further object of the present invention is to provide a new and improved secondary air injection system for providing air into the exhaust manifold of an internal combustion engine so as to increase the combustion of hydrocarbons in the exhaust gases being treated by a catalytic converter characterized in that a rectangular sheet of metal is twisted along its longitudinal center axis one end relative to the other at least one hundred eighty degrees and is positioned with an interference fit in each hose of the system adjacent each check valve for diffusing pressure waves as they pass through the hose to thereby prevent objectionable noises.

Stated broadly, the above and other objects are realized in accordance with the present invention by a secondary air injection system having an air pump and including a metallic pipe connected at one end to and extending along the exhaust manifold of an internal combustion engine. A check valve assembly is connected to the other end of the metallic pipe for allowing air to flow through the metallic pipe into the exhaust manifold so as to facilitate the combustion of hydrocarbons in the exhaust gases to be treated by a catalytic converter. A hose made of an elastomeric material is connected at one end to the air pump and is connected at the other end to the check valve assembly and at least one noise attenuating device is located in the hose for causing the pressure waves generated by the engine and propagated through the metallic pipe and the check valve assembly to be split in two and move along two spiraling paths so as to cause the pressure waves to be diffused whereby objectionable noises are prevented from being created by said pressure waves as they pass through the remainder of the hose.

BRIEF DESCRIPTION OF THE DRAWINGS

Other objects, features, and advantages of the present invention will become apparent from the following detailed description of the invention when considered in conjunction with the following drawings in which.

DETAILED DESCRIPTION OF THE DRAWINGS

Figure 1:
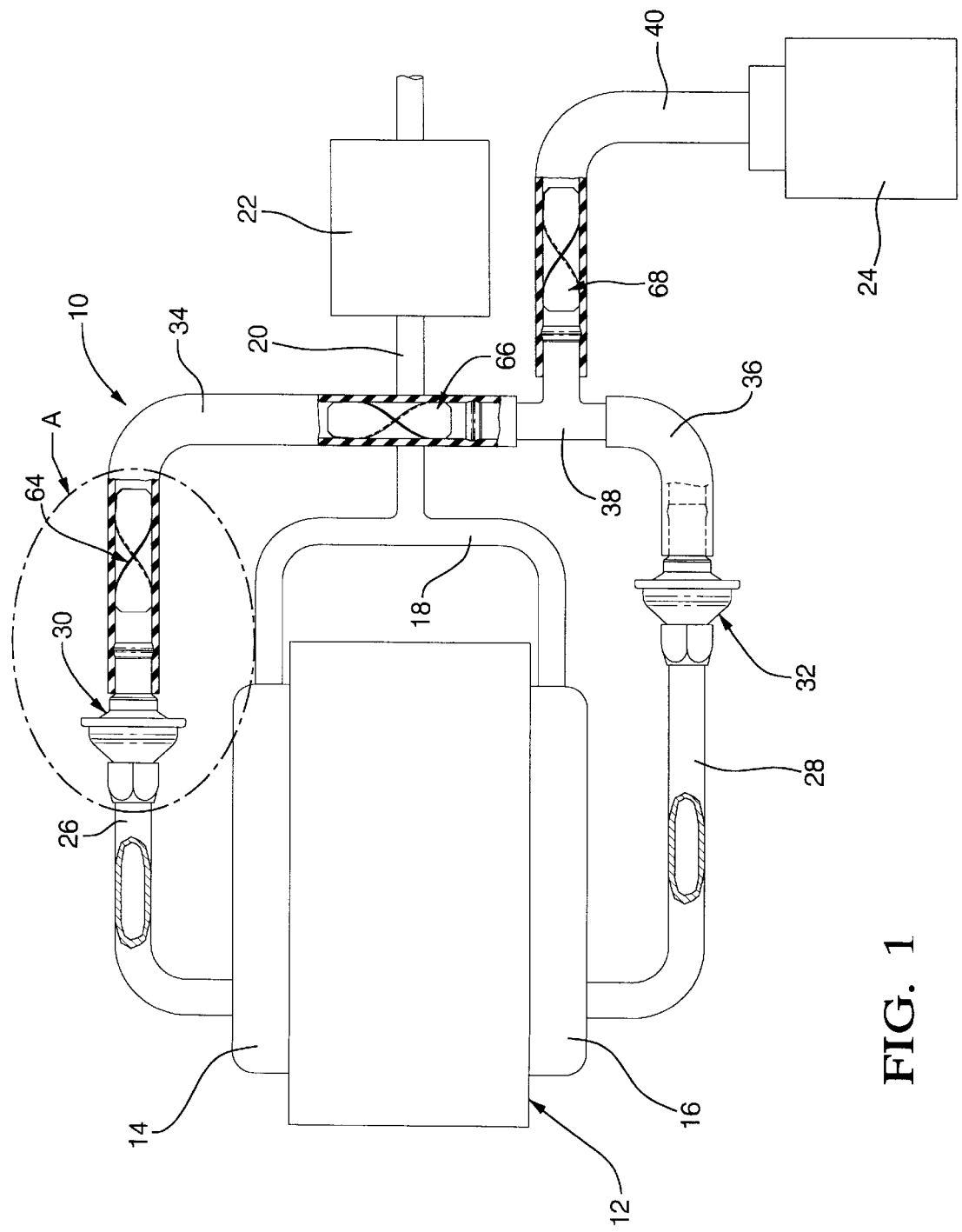
FIG. 1 is a diagrammatic view of a secondary air injection system made in accordance with the present invention with the air pump located to one side of a V-type internal combustion engine.

Referring to the drawings and more particularly FIG. 1 thereof, a secondary air injection system 10 is shown incorporated with a multi-cylinder V-type internal combustion engine 12 having a pair of exhaust gas manifolds 14 and 16 connected by exhaust pipes 18 and 20 to a catalytic converter 22. The catalytic converter 22 is of a conventional type that serves to eliminate the undesirable constituents in the exhaust gases of the engine 12. The secondary air injection system 10 serves to inject air generated by an electric motor driven air pump 24 into the exhaust manifolds 14 and 16 so as to increase the combustion of hydrocarbons in the exhaust gases emitted by the engine 12 and being treated by the catalytic converter 22.

More specifically, the secondary air injection system 10 according to the present invention includes a pair of metallic pipes 26 and 28 made of stainless steel that are respectively connected at their inner ends to the front ends of the exhaust manifolds 14 and 16. The outer ends of the pipes 26 and 28 are connected to a pair of identical check valves assemblies 30 and 32 that allow the air generated by the air pump 24 to flow to the manifolds 14 and 16 and prevent exhaust gases from flowing in the opposite direction. A pair of hoses 34 and 36 respectively connect the check valve assemblies 30 and 32 to a plastic "T" shaped fitting or connector 38 which, in turn, is connected through a hose 40 to the air pump 24. Each of the hoses 34, 36, and 40 are made of an elastomeric material such as rubber.

Figure 7:
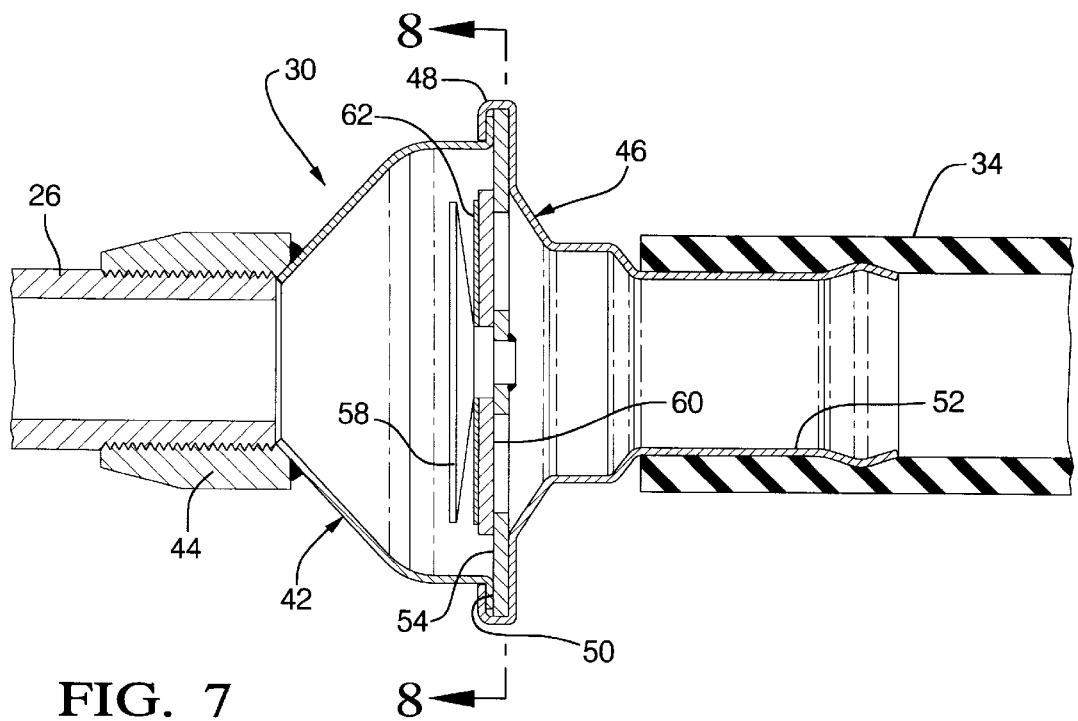
FIG. 7 is an enlarged sectional view of the check valve assembly taken on line 6—6 of FIG. 4.
Figure 8:
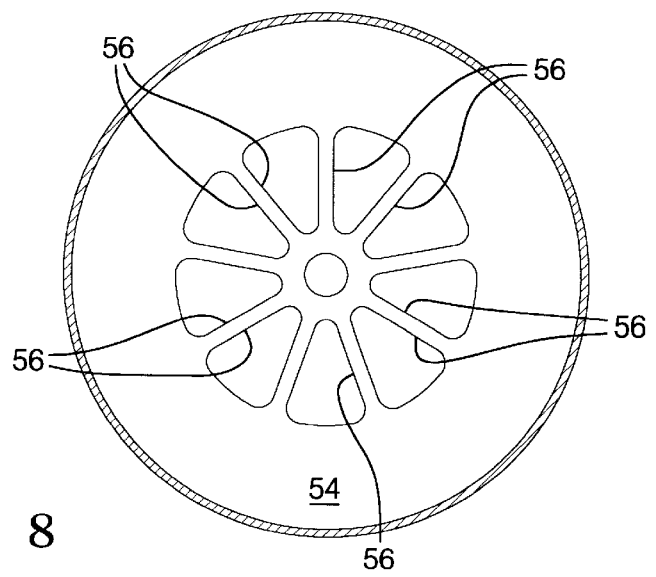
FIG. 8 is a sectional view taken on line 8—8 of FIG. 7.

As seen in FIGS. 7 and 8, the check valve assembly 30 is shown in detail as comprising a two part housing that includes a generally frusto-conical section 42 the free end of which has a nut 44 rigidly secured thereto with its internal threads cooperating with external threads on the outer end of the pipe 26 for attachment therewith. The other section 46 of the housing has its peripheral portion 48 crimped over a radially outwardly extending flange portion 50 of section 42 for sealingly interconnecting the sections 42 and 46 of the housing. As seen in FIGS. 1 and 7, the outer end of the section 46 is integrally formed with an outwardly projecting nipple or tubular portion 52 that is inserted into the hose 34 for retention therein. Located at the crimped joint between the sections 42 and 46 is a valve plate 54 the peripheral portion of which is fixed in position relative to the sections 42 and 46 during the crimping operation. As seen in FIG. 8 the valve plate 54 is formed with a plurality of pie-shaped openings 56 radiating outwardly from its center. A back-up plate 58 is staked to the center of the valve plate 54 with an elastomeric disk valve 60 interposed between the back-up plate 58 and the valve plate 54. A disk spring 62 serves to normally maintain the disk valve 60 in the closed position seen in FIG. 7 relative to the openings 56 in the valve plate 54. During operation of the air pump 24, the air pressure exceeds the strength of the disk spring 62 causing the disk valve 60 to move from its closed seated position seen in FIG. 7 to an open unseated position against the back-up plate 58 so as allow air flow through the openings 56 into the exhaust manifolds 26 and 28 via the pipes 26 and 28.

Figure 4:
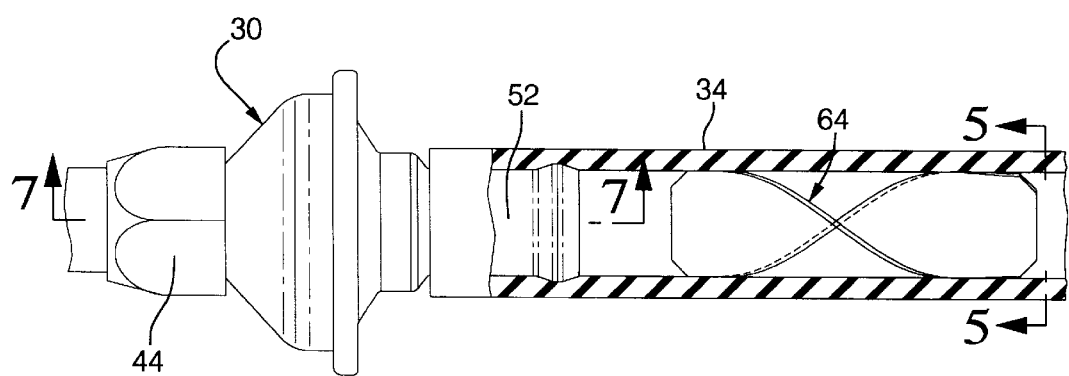
FIG. 4 is an enlarged view of the circled area "A" of FIG. 1 showing a baffle located in close proximity to a check valve assembly, both of which form a part of the secondary air injection system made in accordance with the present invention.
Figure 5:
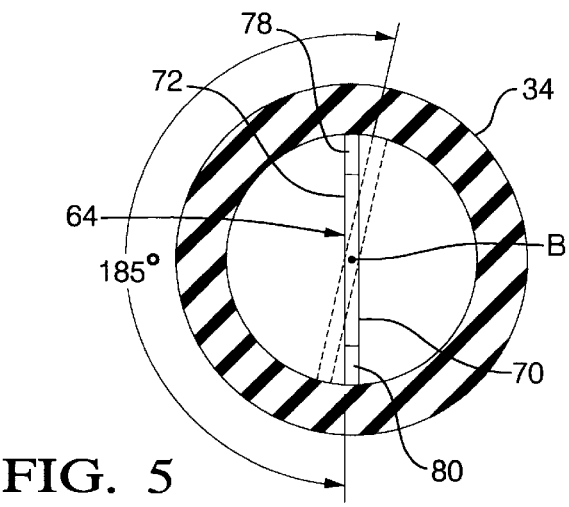
FIG. 5 is an end view of the baffle taken on line 5—5 of FIG. 4.
Figure 6:
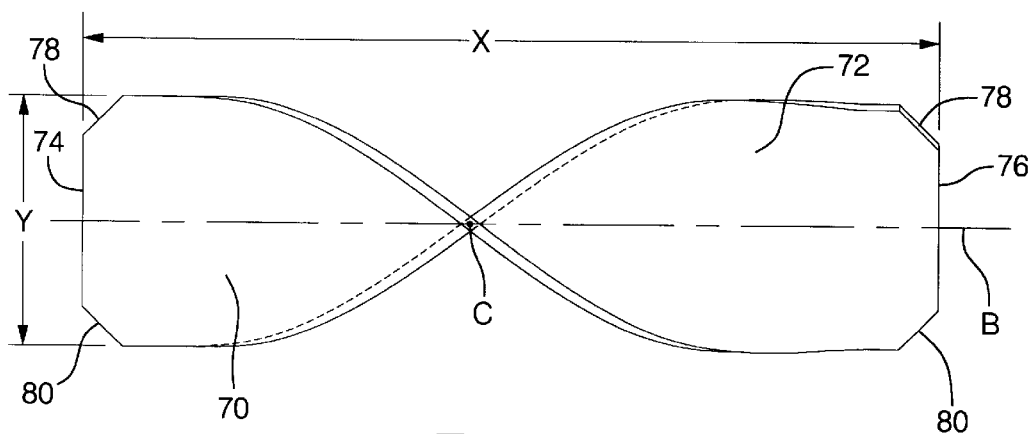
FIG. 6 is an enlarged elevational view of the baffle which forms a part of the present invention.

As alluded to hereinbefore, it has been found that vehicles equipped with secondary air injection systems can experience objectionable noises under certain load and RPM conditions unless some form of muffler device is placed in the hoses. It is believed that the objectionable noises occurring in the hoses of the secondary air injection systems are caused by negative pressure resulting from the exhaust pulsation generated by the firing event occurring in the cylinders of the engine. During such time, the negative pressure in the pipes 26 and 28 cause the disk valve 60 to lift off of its seat and move towards the back-up plate 58. This then causes an audible positive pressure wave to get by the check valve assemblies 30 and 32 by passing through the openings 56 in the valve plate 54 and into the hoses 34 and 40. In this case, however, rather than have a resonator placed in strategic points of the hoses 34 and 40 to eliminate the problem, as done by some vehicles manufacturers, it has been found that inserting a simple baffle of twisted metal within the hoses 34 and 40 of the system as seen in FIG. 1 serves to provide a secondary air injection system that prevents the pressure waves migrating past the check valve assemblies 30 and 32 into the hoses 34 and 40 to cause objectionable noises In this regard, there are three baffles 64, 66, and 68 (as seen in FIG. 1) located in the hoses 34 and 40 of the secondary air injection system 10 for eliminating the objectionable noises in the hoses 34 and 40. (Hose 36, in this instance, is too short to house a baffle and, in addition, its small size prevents pressure waves from generating noises in the hose.) Two of the baffles 64 and 66 are located in the hose 34 and one baffle 68 is located in the hose 40. Each of the baffles 64–68 is identical in construction and as seen in FIGS. 4–6, the baffle 64 takes the form of an elongated flat rectangular sheet of stainless steel that has one end twisted about its longitudinal axis "B" relative to the other end so that, as seen in FIG. 6, the baffle 64 is symmetrical relative to its center "C" when viewed from one position but may not be symmetrical when view from other another position. As seen in FIGS. 5 and 6, the baffle 64 is in the form of a helix and has two opposed side surfaces 70 and 72 that terminate at opposed ends 74 and 76 that are parallel to each other. In addition, each end 74 and 76 of the baffle 64 is formed with a pair of chamfers 78 and 80 to remove pointed corners and facilitate insertion within the accommodating hose 34. Thus, the baffle 64 presents a pair of spiraling surfaces 74 and 76 to the pressure waves as they pass by each of the check valve assemblies 30 and 32 and, in effect, causes the pressure wave to be split into two parts and be diffused.

At this juncture, it should be mentioned that secondary air injection systems of the type described above and shown in FIG. 1 require the fresh air to be provided to the manifolds 14 and 16 under certain conditions only. In other words, the air pump 24 does not operate at all times. Typically, the air pump 24 will be required to provide air to the manifolds 14 and 16 during a cold start when emissions are at their peek and at hot restart. During the cold start phase of the engine, the air pump 24 may operate for about two minutes and on hot restart, for about one minute. A sensor (not shown) strategically placed in the exhaust gas stream and part of an electronic control circuit (not shown) will provide an input signal for activating the electric motor (not shown) of the air pump 24 for a predetermined time interval during the cold start and hot re-start of the engine.

The secondary air injection system 10 diagrammatically shown in FIG. 1 is presently being used by General Motors Corporation to eliminate objectionable noises which would otherwise occur in the hoses of its L31 V-8 engine (Part No. 12557336) installed in its 1999 C/K Sport Utility Vehicle. Without the baffles 64–68 installed in the hoses as seen in FIG. 1, it was found that a objectionable noise would occur at about 2200 RPM and stop at about 3000 RPM under heavy acceleration or wide open throttle when pulling a load on a highway and would start again at about 4400 RPM. However, once the baffles 64–68 were installed in the hoses 34 and 40 to provide the air injection system 10 according to the present invention as shown in FIG. 1, the objectionable noise was eliminated. The air pump 24 forming a part of the air injection system 10 employed by the L-31 engine mentioned above is made by Borg Warner Automotive Air/Fluid Systems located in Salisaw, Okla. and is identified as BWA Production Part No. 00030649D or GM Part No. 12555164. The metallic pipes 26 and 28 connected to the exhaust manifolds 14 and 16 are respectively identified as GM Part No. 12559859 and GM Part No. 12559860. Each of the hoses 34, 36 and 40 is made by Cooper Rubber Company located in Bowling Green, Ohio and have a one inch outer diameter and a three-quarter inch inner diameter. The three hoses 34, 36, and 40 used in the secondary air injection system 10 are identified as follows: Hose 34-GM Part No. 12556037, Hose 36-GM Part No. 12557858, and Hose 40-GM Part No. 15731351. The "T" connector 38 used for interconnecting the hoses 34, 36, and 40 is made of nylon and is identified as GM Part No. 10105352. Each baffle 64–68 is made of stainless steel 30304 ASTM-A-167 and is manufactured by Cooper Rubber Company and each is identified as GM Part No. 12562714. Each baffle 64–68 is 1.5 mm thick and, as seen in FIG.6, has a length dimension "X" equal to 65 mm and a width "Y" equal to 19.63 mm. The check valve assemblies 30 and 32 are made by Robert Shaw Company of Knoxville, Tenn. and each is identified by Robert Shaw and GM as Part No. 12558992. In addition, in order for the baffles 64–68 to be most effective in eliminating the audible noises in the hoses, it has been found that each baffle 64–68 should be positioned in the accommodating hose so that the end 74 or 76 of the baffle adjacent the nipple of the associated check valve assembly is located approximately 10 mm from the end of the nipple 52 of the associated check valve assembly. In the secondary air injection system 10 shown in FIG. 1, inasmuch as the hose 36 is of inadequate length to support a baffle as aforementioned, it was found necessary to place the baffle 66 at the end of the hose 34 and the baffle 68 in the hose 40 with the end 74 or 76 of each baffle being located approximately 10 mm from the end of the associated nipple part of the connector 38. It will also be noted that the baffle has an interference fit with the inner diameter of each of the hoses so that once inserted into the hose in the desired position, such position is maintained through the frictional interaction between the two members.

Figure 2:
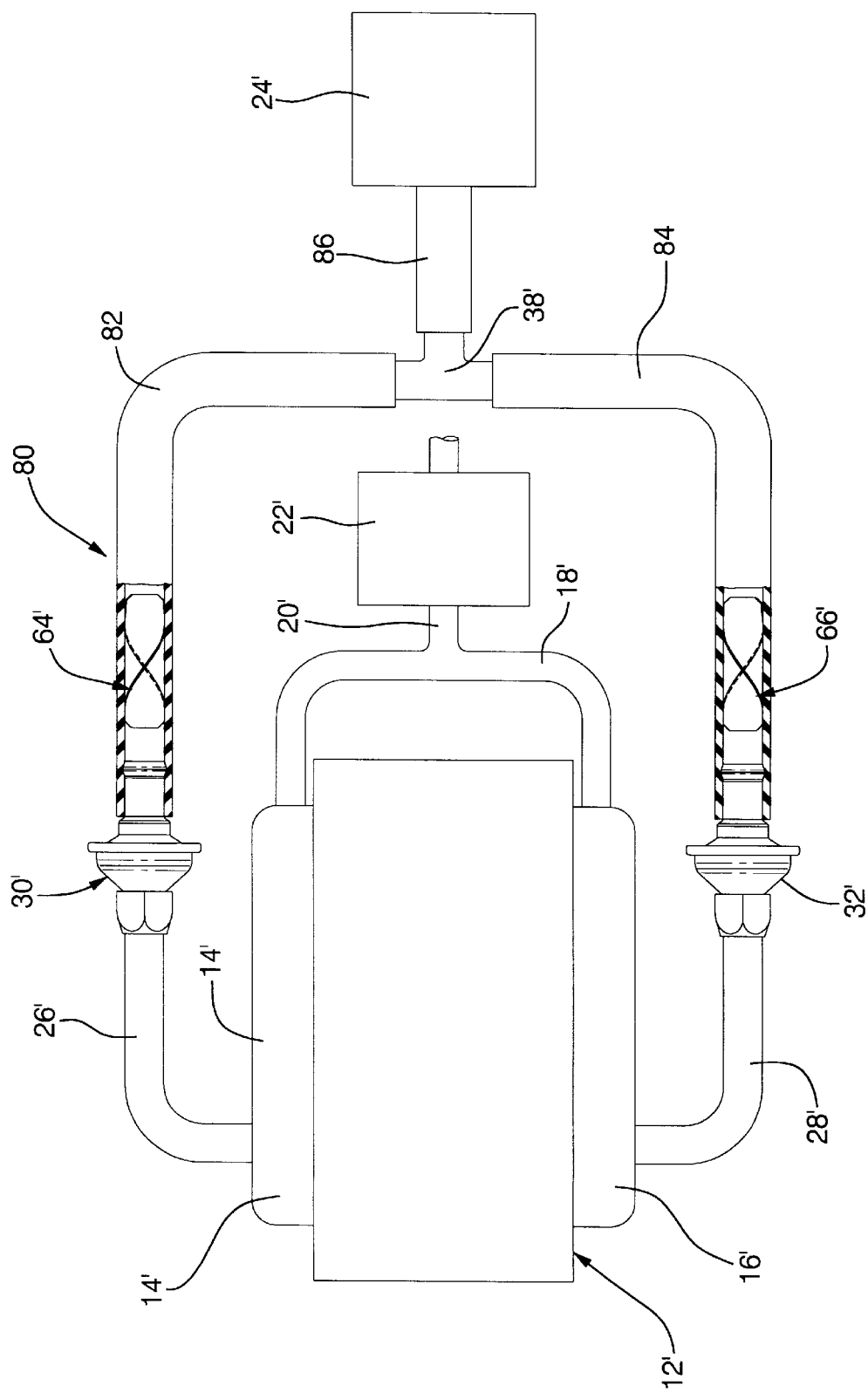
FIG. 2 is a diagrammatic view of a secondary air injection system made in accordance with the present invention with the air pump being located along the longitudinal center axis of a V-type internal combustion engine.

FIG. 2 shows a modified arrangement of a secondary air injection system 80 in which the parts corresponding to the parts of the system seen in FIG. 1 are identified by the same reference numerals but primed. As seen in FIG. 2, the engine 12' diagrammatically shown is the same as the engine 12 in FIG. 1 with the exhaust manifolds 14' and 16' connected to the air pump 24' via hoses 82 and 84 and pipes 26' and 28', respectively. In this case, however, the hoses 82 and 84 connected respectively to the check valve assemblies 30' and 32' are of substantially equal length and each has sufficient room for accommodating a baffle. Accordingly, baffles 64' and 66' are located in hoses 82 and 84, respectively adjacent an associated check valve assembly 30', 32' and each baffle 64' and 66' is positioned with one of its ends approximately 10 mm from the nipple portion of the associated check valve assembly. In addition, the "T" connector 38' interconnects the hoses 82 and 84 and is connected by a hose 86 to the air pump 24'. Thus, a V-type engine is provided with a secondary air injection system 80 that utilizes two rather than three baffles as provided in the secondary air injection system of FIG. 1.

Figure 3:
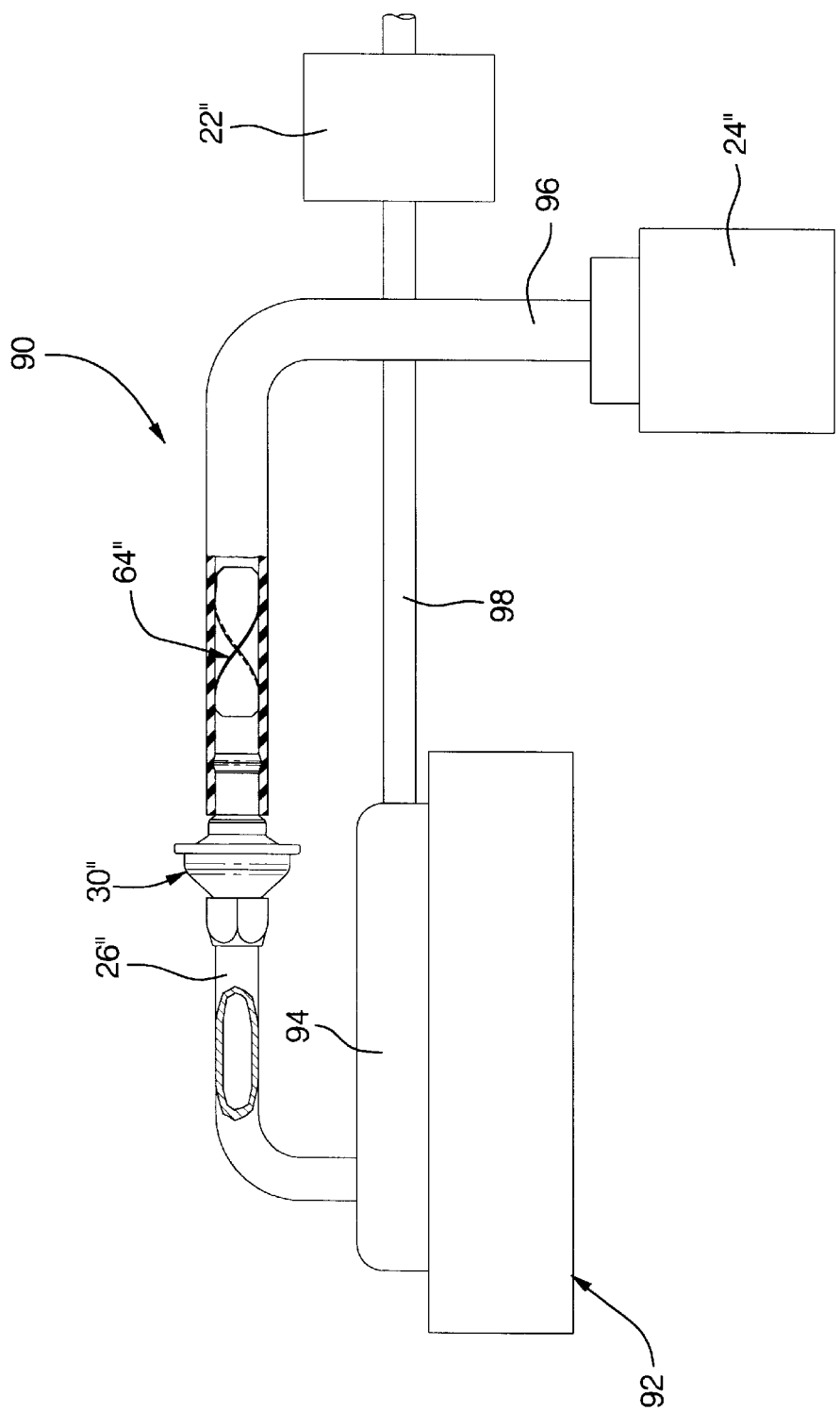
FIG. 3 is a diagrammatic view of a secondary air injection system made in accordance with the present invention and incorporated with an in-line multi-cylinder engine.

FIG. 3 shows a secondary air injection system 90 according to the present invention incorporated with an in-line multi-cylinder internal combustion engine 92. In this instance, the parts of the system 90 seen in FIG. 3 that are identical to the parts of the air injection system 10 of FIG. 1 are identified by the same reference numerals but double primed.

As seen in FIG. 3, a pipe 26" has one end connected to the exhaust gas manifold 94 while the other end of the pipe 26" is connected to a check valve assembly 30". A hose 96 of elastomeric material is connected at one end to the check valve assembly 30" while the other end of the hose 96 is connected to an air pump 24" for providing secondary air to the manifold 94 via the check valve assembly 30". As with the air injection systems 10 and 80 seen respectively in FIGS. 1 and 2, a baffle 64" is located in the hose 96 adjacent the check valve assembly 30" and positioned with one end of the baffle 64" at approximately 10 mm from the nipple 52" of the check valve assembly 30". In this case, and exhaust pipe 98 is connected to the catalytic converter 22".

It will be noted that in forming each of the baffles 64–68, a rectangular blank of stainless steel is used having a width dimension as indicated above and a length dimension that will provide a finished longitudinal length as mentioned above. Thereafter, one end of the blank is held stationary while the other end is twisted or rotated about the longitudinal center axis of the blank at least 180 degrees to form the baffle. It has been found that the baffle is most effective in eliminating the objectionable noises in the secondary air injection system 10 of FIG. 1 when one end is twisted relative to the other approximately 185 degrees and up to 270 degrees. It has also been found that the helix pitch affects the flow restriction. In other words, if the twist is greater than 185 degrees without lengthening the blank, there is in increase in restriction on the flow of the secondary air from the air pump to the exhaust manifolds. To avoid this restriction, the baffle should be lengthened to maintain proper flow.

Various other changes and modifications can be made to the secondary air injection system described above without departing from the spirit of the invention. Such changes and modifications are contemplated by the inventors and they do not wish to be limited except by the scope of the appended claims.

What is claimed is:

1. An air injection system having an air pump for providing air into the two exhaust manifolds of a V-type multi-cylinder internal combustion engine to facilitate the combustion of hydrocarbons in the exhaust gases being treated by a catalytic converter, said air injection system including a first metallic pipe connected at one end to one of said manifolds, a second metallic pipe connected at one end to the other of said manifolds, first and second check valve assemblies respectively connected to the other end of said first and second metallic pipes for allowing air to flow from said air pump through said metallic pipes into said exhaust manifold and preventing air flow in the opposite direction, a T-type connection, a first hose made of an elastomeric material connected at one end to said air pump through said T-type connection and connected at the other end to said first check valve assembly, a second hose made of an elastomeric material connected at one end to said air pump through said T-type connection and connected at the other end to said second check valve assembly, and a noise attenuating device located in each of said first and second hoses adjacent the associated check valve assembly, said noise attenuating device taking the form of a generally rectangular strip of metal twisted one end relative to the other end so as to cause the pressure waves generated by said engine and propagated through said first and second metallic pipes and said first and second check valve assemblies to impinge upon the compound surface of the attenuating device and be divided and diffused as they move along spiraling paths so as to prevent objectionable noises from being created by said pressure waves as they pass through the remainder of said hose.

2. The air injection system as set forth in claim 1 wherein the opposed corners of said strip of metal are chamfered at the end that is to be inserted into said opening of said hose.

3. The air injection system as set forth in claim 1 wherein said strip of metal is slightly larger in width than the diameter of said opening in said hose so as to provide an interference fit between the two upon insertion of said noise attenuating device into said opening.

4. The air injection system as set forth in claim 1 wherein said strip of metal is of uniform width.

5. The air injection system as set forth in claim 1 wherein said one end of said strip of metal is twisted along its longitudinal center axis at least one hundred eighty degrees relative to its other end.

6. The air injection system set forth in claim 1 wherein said one end of said strip of metal is twisted one end relative to the other more than 180 degrees but less than 270 degrees.

* * * * *